April 4, 1939.  R. C. PIERCE  2,153,480
PARKING METER
Filed April 7, 1936   5 Sheets-Sheet 3
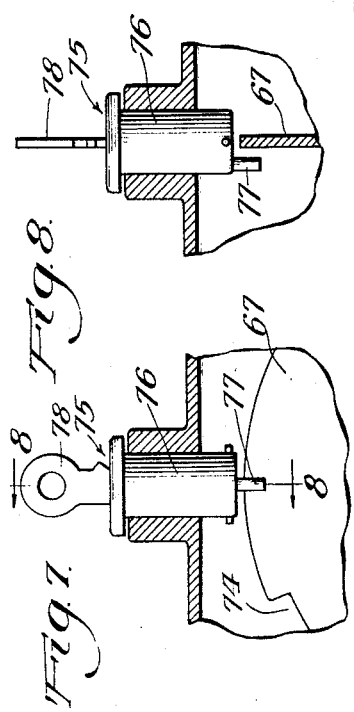
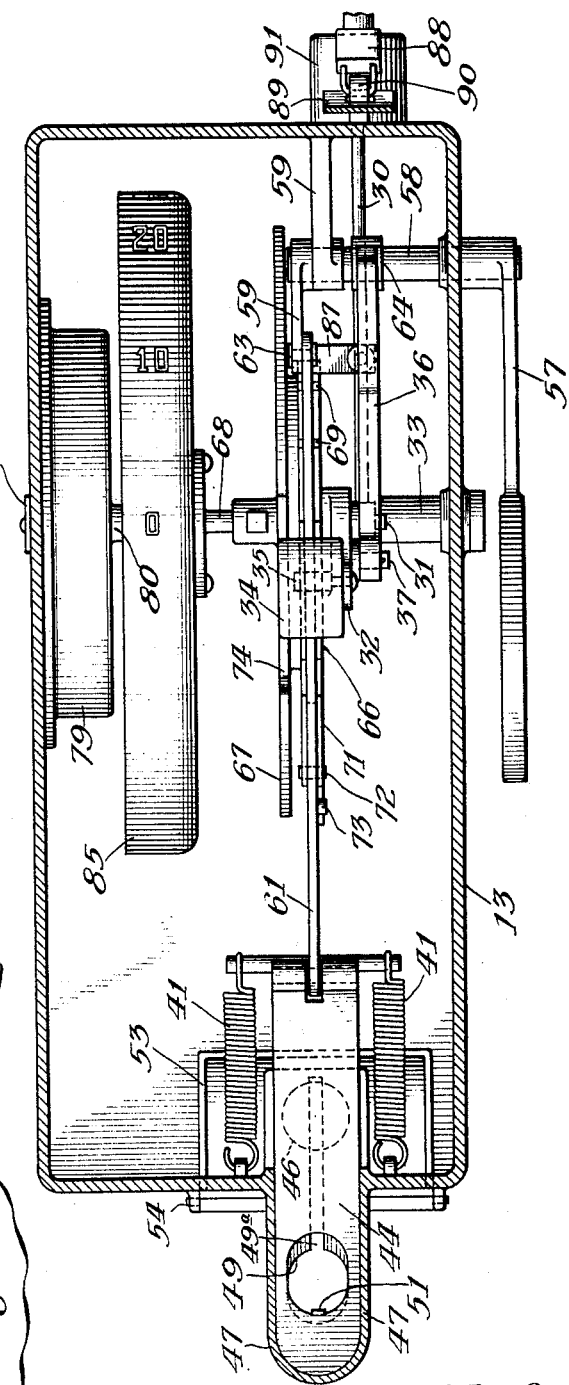
Inventor:
Raymond C. Pierce,
By Dyrenforth, Lee, Chritton &Wiles
Attorneys April 4, 1939.   R. C. PIERCE   2,153,480
PARKING METER
Filed April 7, 1936   5 Sheets-Sheet 4

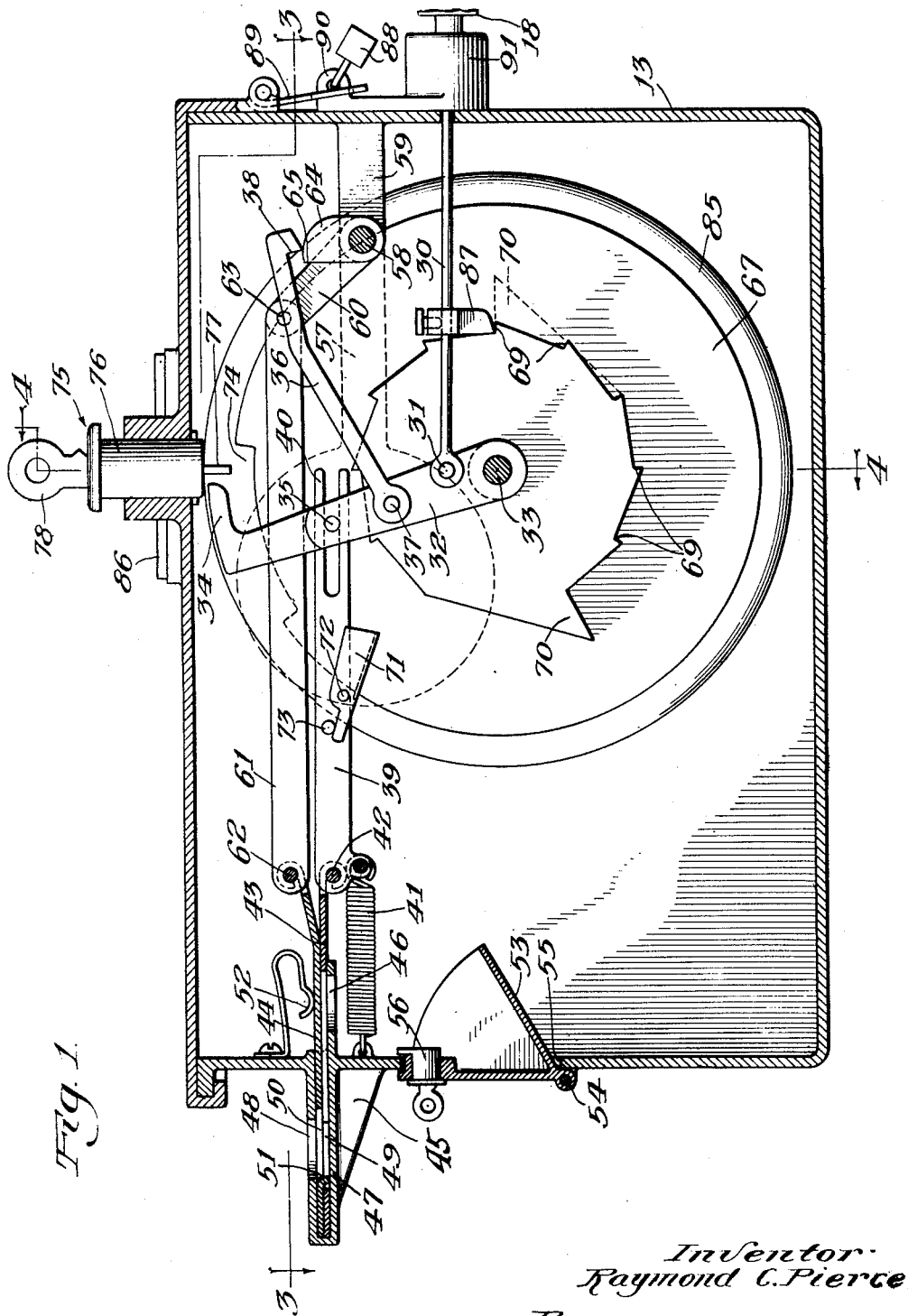

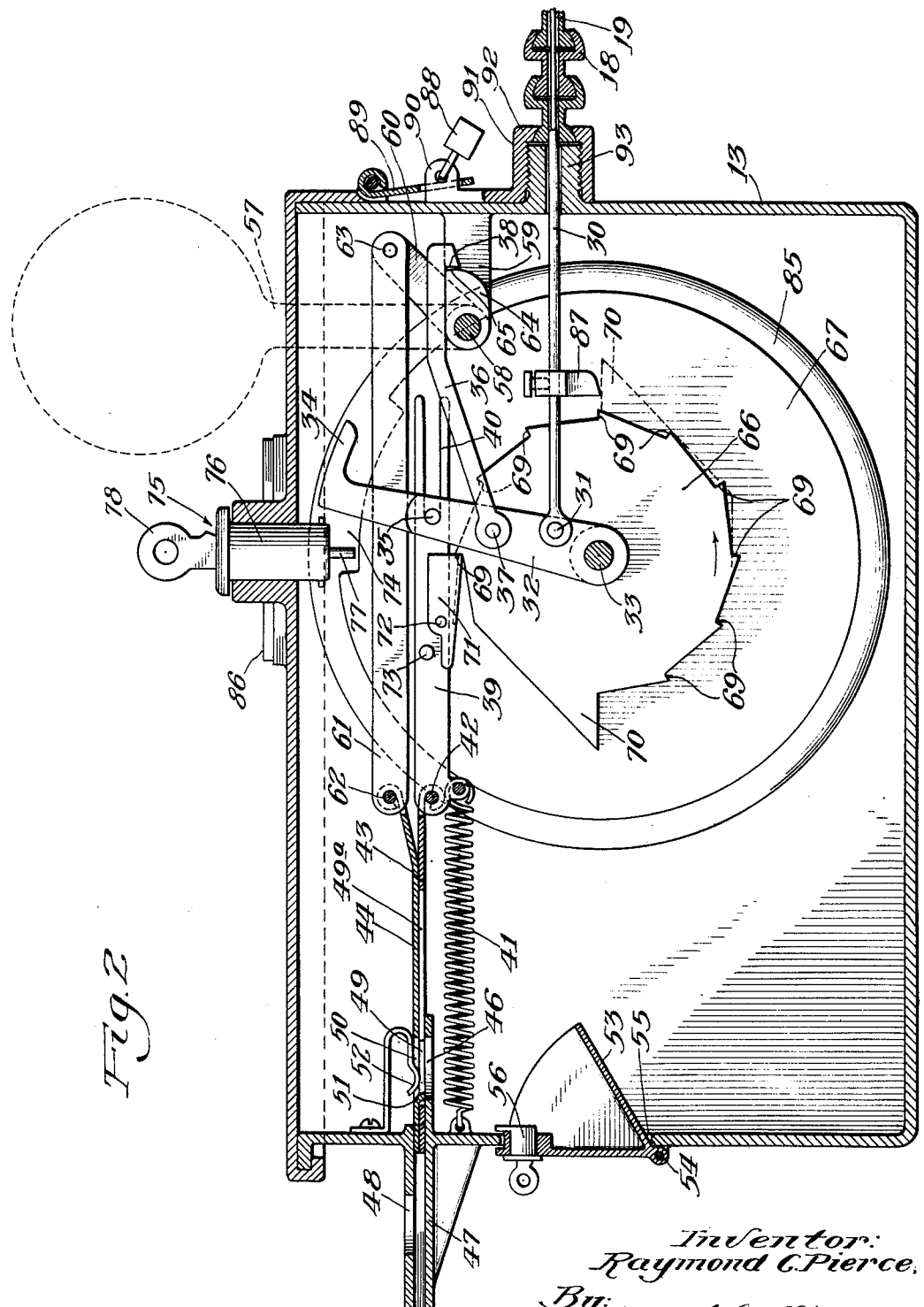

Inventor:
Raymond C. Pierce,
By Dyrenforth, Lee, Chritton & Wiles
Attorneys

April 4, 1939.　　　R. C. PIERCE　　　2,153,480
PARKING METER
Filed April 7, 1936　　　5 Sheets-Sheet 5
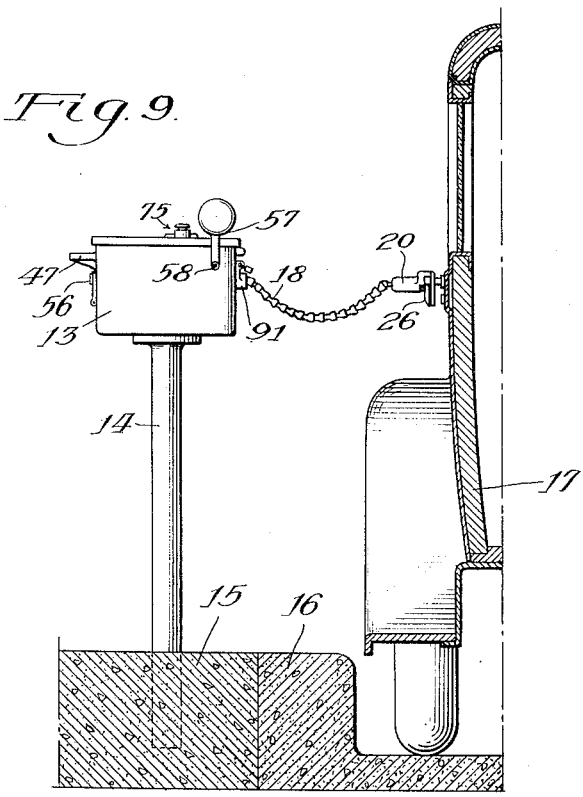
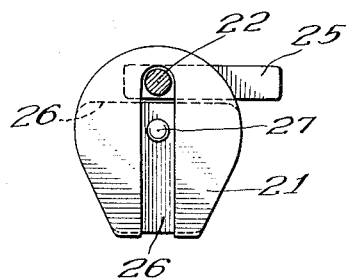
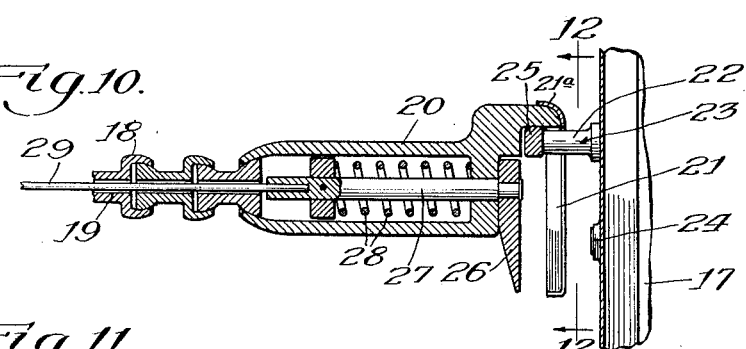
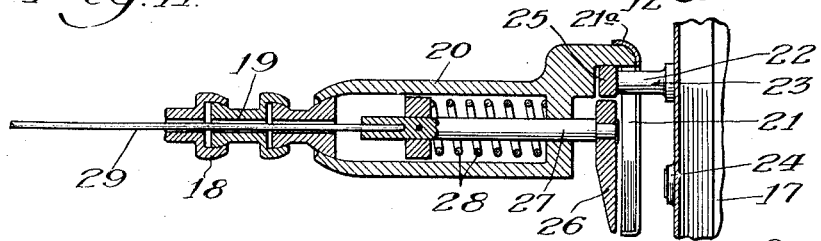
Inventor:
Raymond C. Pierce,
By: Dyrenforth, Lee, Chritton & Wiles
Attorneys Patented Apr. 4, 1939

2,153,480

UNITED STATES PATENT OFFICE 2,153,480

PARKING METER

Raymond C. Pierce, Chicago, Ill., assignor to John W. Bullock, Memphis, Tenn.

Application April 7, 1936, Serial No. 73,180

9 Claims. (Cl. 194—78)

My invention relates to mechanism for insuring the payment for parking privileges particularly where the payment required is dependent on the length of time the vehicle remains parked.

My primary objects are as follows:

To enable cities, towns and villages to control automobile parking and to secure additional revenues by charging for the use of streets when used for parking purposes.

To relieve police officers from timing parked automobiles to learn whether parking violations occur.

To safeguard automobiles from theft.

To force motorists to park their cars close to the curb and to prevent parking with one end of the automobile projecting unduly into the street.

To compel the proper spacing of parked automobiles enabling motorists to easily place automobiles into parking position and drive them away without danger of damage to bumpers, fenders, and other projecting parts.

To avoid the expense of painting curbs or pavements to indicate parking stalls.

To provide a mechanism by which payment need be made only for the unit, or units, of parking time actually consumed but which will insure the payment for the full time for which payment is required and without requiring the attention of a police officer; and other objects as will be manifest from the following description.

Referring to the accompanying drawings:

Figure 1 is a view in side elevation, partly sectional, of a parking meter embodying my invention, showing the parts in the position they assume in the normal, out of use, condition of the mechanism.

Figure 2 is a similar view showing one of the positions assumed by the parts when the meter is actuated for use.

Figure 3 is a plan sectional view of the meter, the section being taken at the irregular line 3—3 on Fig. 1 and viewed in the direction of the arrows.

Figure 4:
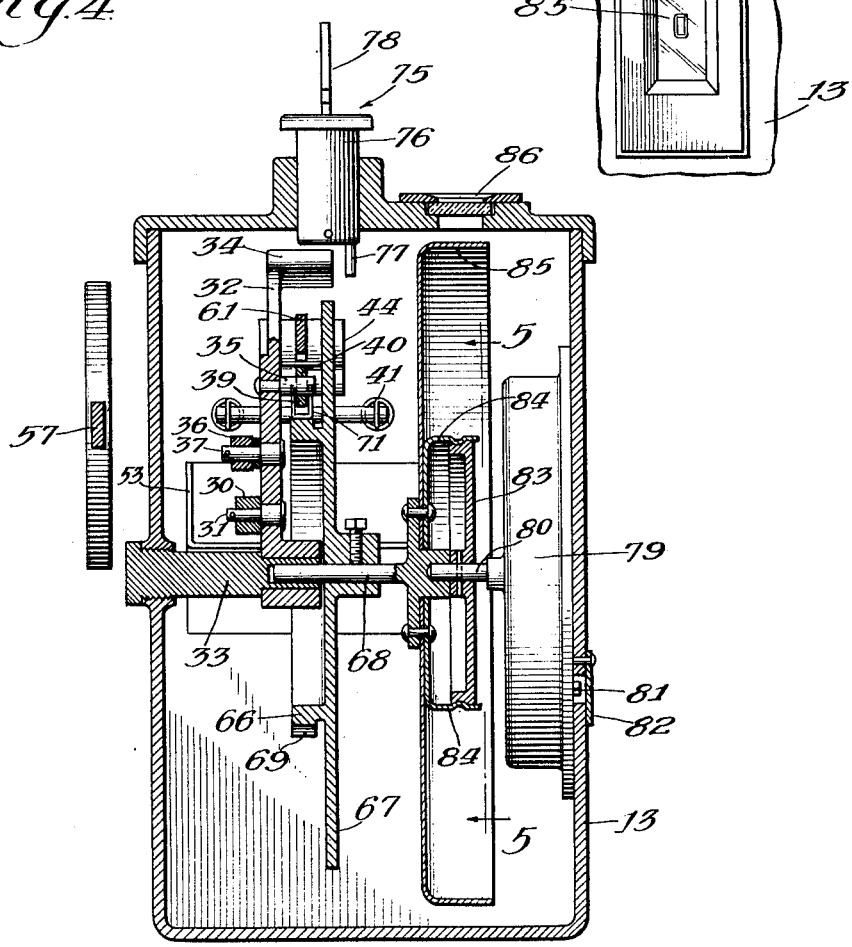

Figure 4 is a vertical sectional view taken at the irregular line 4—4 on Fig. 1 and viewed in the direction of the arrows.

Figure 5:
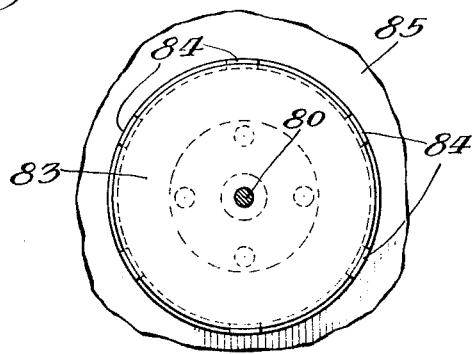

Figure 5 is a fragmentary sectional view taken at the line 5—5 on Fig. 4 and viewed in the direction of the arrows.

Figure 6:
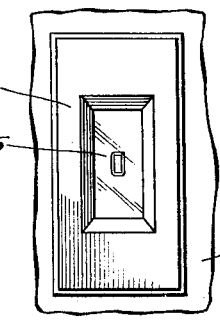

Figure 6 is a fragmentary plan view of the mechanism of Figs. 1—4 illustrating the means for indicating the number of checks to be deposited into the machine for restoring the mechanism to normal unlocked condition.

Figure 7 is a fragmentary view, partly in section, of key-operated lock means controlling the actuation of the mechanism, illustrating the relationship thereto of a portion of the mechanism in a position it assumes when the parking interval is in excess of that paid for by the initial deposit of a check into the mechanism.

Figure 8 is a broken section taken at the line 8—8 on Fig. 7 and viewed in the direction of the arrows.

Figure 9 is a view, partly in section, of the mechanism of the preceding figures shown as installed adjacent the curb of a street, with an automobile parked at the mechanism and anchored thereto under the control of the mechanism.

Figure 10 is a broken sectional view of the handle and lock-equipped portion of an automobile together with the restraining element therefor shown in normal unlocked condition in which the restraining element may be applied to, or removed from, interlocked engagement with a handle portion of the car.

Figure 11 is a view similar to that shown in Fig. 10 and of the parts therein illustrated, showing the restraining element in locked position on the handle; and Figure 12, a section taken at the line 12—12 on Fig. 10 and viewed in the direction of the arrows.

Referring to the particular illustrated embodiment of my invention, it comprises a casing 13 rigidly secured to the top of a post 14 shown as anchored in the sidewalk 15 adjacent the point where it is desired that the automobile, such as that represented at 17, be parked alongside of the street curb represented at 16.

Secured at one end to the casing 13 is a chain 18 shown as of the common swivel ball and socket link type and having a longitudinal bore 19 extending entirely therethrough. The outer end of the chain which, together with the means thereon for attachment to the automobile and hereinafter described, form an anchored restraining element for the automobile preventing the driving away of the automobile from its parked position, is equipped with a hollow clamp-head 20 terminating in a claw-like member 21 adapted to be mounted in straddling position, as shown, on the stud portion 22 of one of the door handles 23, preferably on the front right-hand door on which the lock for the door, either located in this handle, or on the door remote from the handle as represented at 24, is provided. The portion 21 which is of rather large area as shown to cover the lock 24 and prevent unlocking of the automobile when the chain 18 is attached thereto, and covered with a protective covering 21ᵃ as for example of rubber to prevent marring the finish on the automobile, is spaced from the adjacent end of the head 20 throughout the greater portion of its height, to receive between it and the end of the head, the bar portion 25 of the handle 23, as shown in Figs. 10-12.

Cooperating with the head 20 is a lock bar 26 secured to the outer end of a rod 27 slidable in the head 20. In the normal position of the bar 26 (Fig. 10) the clamp head 20 is free to be applied to, and removed from, the handle 23, but when shifted to the position shown in Fig. 11 to extend beneath the bar 25 of the handle, locks the head 20 against rotation on, and removal from, the handle 23.

The position of the lock bar 26, which is normally spring pressed by the spring 28 to the unlocked position shown in Fig. 10, is controlled by a flexible thrust wire 29 slidable in the bore 19 of the chain 18, the wire 29 cooperating with mechanism located in the casing 13 and now to be described, for controlling the position of the lock bar 26.

The control mechanism referred to comprises a rod 30 extending outwardly through a side of the casing 13 and into the bore 19 to abut the inner end of the wire 29. This rod is pivoted at 31 to a lever 32 journaled on a stud 33 extending inwardly from a side of the casing. The upper end of the lever 32 has a shoe portion 34 and is provided between its ends with a pin 35 and below this pin is provided with a stop lever 36 pivoted thereto as represented at 37, the outer end of this stop lever having a hook 38.

In the normal position of the parts (Fig. 1) the rod 30 is in withdrawn position permitting the lock bar 26 to be out of locking position (Fig. 10), but in being moved from this position to the position shown in Fig. 2 the thrust of the rod 30 moves the lock bar 26 to locking position (Fig. 11).

In the particular construction shown the lever 32 is moved to the position shown in Fig. 2 by check-controlled mechanism comprising a slide bar 39 containing in one end a slot 40 into which the pin 35 extends and at its other end connected with a pair of coil springs 41 tending to move this slide to the position shown in Fig. 1. The bar 39 is pivotally connected at 42 with the lower slide 43 of the check-controlled mechanism, the upper slide of which is shown at 44, the slides 43 and 44 being superposed on a ledge 45 extending into the casing and having a check-receiving opening 46. The outer ends of the slides 43 and 44 extend through the casing 13 and slide in a housing 47 on the casing, the upper wall of the housing having an opening 48 to receive the controlling check, such as a coin.

Any suitable means for actuating the slide 43 by means of the slide 44 through the medium of an interposed check, as for example a coin, may be provided, such as for example the construction of mechanism shown and commonly known and involving check-receiving openings 49 and 50 in the slides 43 and 44, respectively, which register with the opening 48 in the normal position of the parts; a lug 51 on the slide 44 which extends into the opening 49 in the slide 43; and an ejector spring 52 on the casing 13 for forcing the check from the slides 43 and 44 and through the opening 46 to a box 53 pivotally mounted at 54 in an opening 55 in the front of the casing and controlled by a lock 56.

The proper check deposited into the openings 50 and 49 in the slides to rest on the bottom of the housing 47 thus affords, by becoming interposed between the lug 51 and the wall at the far side of the opening 49, a connection between these slides whereby upon moving the slide 44 to the right in Fig. 1, the slide 43 will be moved in the same direction against the action of the springs 41 thus rocking the lever 32 to the position shown in Fig. 2, the check automatically dropping into the box 53 at the conclusion of this operation and freeing the slide 43 for return to normal position (Fig. 1).

The slide 44 is operated through the medium of a target lever 57 fixed on a stub shaft 58 journaled in the casing 13 and in a bracket 59, this lever carrying an arm 60 connected with the slide 44 by a link 61 pivotally connected to these parts at 62 and 63. The shaft 58 carries a lug 64 angularly disposed to the target lever 57 and having a portion 65 adapted for interlock with the hook 38 of the gravity lever 36 when the latter is operated by the slide 43 as above stated, in which operation the target lever 57 moves to vertical position (Fig. 2).

The control mechanism also comprises lock means for controlling the return of the lever 32 to normal position (Fig. 1) in which the locking bar 26 is removed from locking position; these means comprising a ratchet wheel 66 mounted on the side of a disk 67 of greater diameter than, and eccentric to, the wheel 66. The disk 67 is fixed on a shaft 68 journaled in an end of the stud 33 and on the hour-hand shaft of clock mechanism hereinafter described. The ratchet wheel 66 is shown as having a series of uniform ratchet teeth 69 and a tooth 70 protruding beyond the periphery of the wheel 66 a greater distance than the teeth 69. The wheel 66 cooperates with a pawl 71 pivoted at 72 on the slide 43 and operating each time the slide is forced inwardly to rotate the wheel 66 a distance equal to the peripheral length of each tooth 69. A stop-pin 73 prevents the pawl from swinging out of operative position.

The disk 67 has a notch 74 in its periphery of a length substantially equal to the peripheral travel of the disk 67 when driven by a single actuation of the slide 39, the peripheral edge portion of the disk 67 cooperating with a lock 75, shown as key-controlled, in the top of the casing 13.

The lock 75 which is of the sliding and rotatable barrel type, the barrel being indicated at 76 and equipped with a depending eccentrically positioned pin 77 as commonly provided in this type of lock, is adapted for operation by a key 78 and is of such construction that locking is effected by pressing down on the key to lower the barrel 76 and rotating the barrel one-half a revolution which moves the depending pin 77 from the position shown in Fig. 4 crosswise through the notch 74 to the other side of the disk 67 to a position above the bottom of the notch 74 but below the peripheral portion of this disk and lowers the barrel 76 below the upper end of the lever 32, in which position of the lock the key 78 may be removed, the key being held against removal when the barrel 76 is in raised, unlocked, position (Fig. 4).

Associated with the disk 67 and ratchet wheel 66 are means for rotating these parts counter-clockwise in Fig. 2 at such a rate that the wheel and disk move the distance of one tooth 69 during the desired unit of parking time, as for example, one hour.

The means for this purpose may comprise any suitable mechanism as for example a clock mechanism represented at 79, to the hour-hand shaft 80 of which the shaft 68 of the disk 67 is frictionally engaged to drive the ratchet wheel 66 and disk 67 counterclockwise in Fig. 2 but permit the ratchet-wheel and disk 67 to be rotated clockwise independently of the clock-mechanism under the action of the check-controlled mechanism above described, the clock being wound by a key applied to the winding shaft 81 of the clock and covered by a pivoted cover 82.

The means shown for providing the frictional drive referred to comprises a disk 83 fixed on the hour-hand shaft 80 which latter is journaled in the end of the shaft 68, and a series of spring fingers 84 mounted on the shaft 68 and bearing, under spring tension, against the periphery of the disk 83 with the necessary pressure to cause this mechanism, which is in the nature of a clutch, to function for the purpose stated.

A dial 85 secured to the shaft 68 and having spaced markings on its periphery for observance through a sight-opening 86 in the top of the casing, affords a means for indicating to the operator the number of units of parking time the automobile has been parked, in excess, if any, of the one paid for by the check inserted into the machine at the beginning of the parking period, the markings in this particular construction being in multiples of 10, by way of example, indicating the number of dimes required to be inserted into the mechanism to release the automobile.

The operation of the mechanism is as follows:

In the normal position of the parts (Figs. 1, 3, 4, 5 and 11) the locking bar 26 is withdrawn from handle-locking position, the slides 39, 43 and 44 are retracted, the lock 75 is in raised position and the target lever 57 extends substantially horizontally.

To park the automobile it is driven close to the curb 16 to bring the door handle 23 within reach of the clamp-head 20. The operator then locks the car door and applies clamp head 20 to the handle 23 (Fig. 10). He then inserts the proper coin, as for example a dime, into the coin slot 48 and swings target-lever 57 upwardly to vertical position which, through the interposed coin, forces the slides 43 and 39 to the right and by engagement of the slide 39 at its slot 40 with the lever 32 swings this lever to the position shown in Fig. 2, thus forcing the locking bar 26 to handle-interlocking position (Fig. 11), the pawl 71 in this movement of the slide engaging the ratchet 66 and rotating it in clockwise direction the distance of one tooth to the position shown in Fig. 2. In this movement of the target-lever 57 the stop lever 36 drops into a position in which it interlocks with the locking portion 65 on the target shaft 58 (Fig. 2), the shoe 34 on lever 32 becoming positioned to the right beyond the lock 75 as shown in this figure.

The operator then pushes down on the lock-barrel 76 and rotates it with the key 78 to the locked position shown in Fig. 2 and removes the key.

In the final movement of target-lever 57 to the position stated the coin is automatically ejected from the check-controlled mechanism into the box 53, whereupon the slides 39 and 43 return, under the action of the springs 41, to normal position (Fig. 1) (the slide 43 having an extension 49ª of its opening 49 to receive the lug 51) which retracts the slotted portion 40 of the lever 39 and removes the pawl 71 from the path of movement of the teeth on ratchet wheel 66.

Assuming that the automobile has remained parked for not more than the unit of parking time, as for example one hour, paid for by the initially deposited coin, the operator, to release the automobile, restores the lock-barrel 75 to normal, raised, position, by inserting and turning the key 75, and swings the target-lever 57 to horizontal position which retracts the slide 44 to the position shown in Fig. 1 and disengages the lock-lever 36 from the lock-portion 65, thus permitting the spring 28 to withdraw the locking bar 26 from locking position and return lever 32 to normal position, thus permitting clamp head 20 to be removed from the handle 23. A stop 87 on the rod 30 cooperates, in this normal position of the parts, with the adjacent ratchet tooth 69, to arrest counterclockwise rotation of the ratchet wheel 66 under the driving action of the clock-mechanism 79, and, in turn, stop this clock mechanism, the springs 84 being under such tension that the power exerted by the driving element of the clock is overcome.

Assuming that the automobile has remained parked a greater length of time than that paid for by the initially deposited coin, say for example, approximately an hour and a half, the clock mechanism will have rotated the ratchet wheel 66 and disk 67 and dial 85 counterclockwise to a position in which the right-hand end of the notch 74 has passed beyond the pin 77, thus preventing the unlocking of the lock 75 (Fig. 7) until the disk 67 is returned to a position in which the notch 74 registers with the pin 77. This can be accomplished by the operator only by inserting an additional coin into the check-controlled mechanism and again swinging the target lever 57 upwardly to vertical position to actuate the ratchet wheel 66 one step by the pawl 71 and thereafter again swinging the target lever to horizontal position to release the lock lever 36 to permit the lever 32 to return to normal position to release the lock-bar 26, the indicator dial 85 showing to the operator that the deposit of this additional coin was necessary before the automobile could be released.

Inasmuch as the lock barrel 76, in locked position, extends into the path of return movement of the lever 32 this lever will be held in locking position during the actuation of the target-lever 57 for operation of re-setting the ratchet wheel 66 through the additional coin as above referred to.

The mechanism as shown, and by way of example, provides for payment for parking over ten units of parking time, it being understood that when the automobile has remained parked for any number of such units of time, in excess of the one unit initially paid for, it will be necessary to pay into the mechanism as many extra coins as there are excess of units of parking time consumed followed, after each coin-insertion, by the operation of the target lever 57 as above described to restore the ratchet wheel 66, disk 67 and dial 85 to normal position, the markings on the dial 85 indicating the additional number of coins required to be inserted to effect the release of the automobile.

Inasmuch as parking is permitted at night in most cities it is desirable that the meter be so designed that no payment will be required for parking during such period, but that payment be limited to ten to twelve hours of parking. To this end the tooth 78 is provided which, upon engaging the stop 87, arrests movement of the ratchet wheel 66 and, through the spring clutch 84, the operation of the clock mechanism 79.

The top of the casing is preferably removable and secured in place by a lock 88 shown as holding in place a hasp 89 pivoted on the casing top. The lock engages a keeper 90 for the hasp, this keeper being provided on a removable section 91 of the casing 13 and having a tubular socket portion 92 in which the innermost ball section of the chain 18 is seated and secured in place, the portion 92 being shown as screwed upon a threaded boss 93 on the casing 13.

Thus an attendant having a key for the lock 88 may remove the casing top and release the mechanism controlling the lock-bar 26 to release the clamp-head 20 from the automobile should the mechanism become impaired for actuation to automobile-unlocking condition by the insertion of the proper number of coins; or if desired, by removing the lock 88, the attendant may unscrew the casing section 91 whereupon the lock bar 26 is freed to move to unlocked position.

The provision of the clamp-head 20 as described not only serves as a means for attachment to the door-handle of an automobile to be parked, but also where the key-controlled lock for the door is in the handle or provided close to the handle and the handle may not rotate when the door is locked, as a shield preventing unauthorized persons from gaining access to the interior of the automobile and starting the automobile before the chain 18 is released therefrom.

While I have illustrated and described a particular construction embodying my invention, I do not wish to be understood as intending to limit it thereto, as the same may be variously modified and altered without departing from the spirit of my invention.

What I claim as new, and desire to secure by Letters Patent, is:

1. In combination, anchored restraining mechanism for an automobile to restrain movement thereof, and check-controlled means operative upon initial operation of said means through the medium of a check to condition said mechanism for restraining the automobile, locking means for said mechanism in restraining position, said check-controlled means comprising timing means operated in one direction by a step movement in the movement of said first-named means upon the deposit of a check and including drive mechanism moving said timing means in the opposite direction and operating to require the payment of an additional check, or checks, depending on the length of the period of parking when it exceeds the predetermined parking period paid for by the initially-deposited check, to permit movement of said locking means to a position in which said mechanism may move out of restraining position.

2. In combination, anchored restraining mechanism for an automobile to restrain movement thereof, and check-controlled means controlling the movement of said mechanism comprising a member movable to control the movement of said mechanism to restraining position, mechanism operable through the medium of a check for controlling said member, a lock device operating in locked condition to restrain movement of said member out of restraining position and when unlocked being out of such restraining position, a timing member and driving means therefor, means for releasably locking said first-named member in a position in which said first-named mechanism is in restraining position comprising a member movable from unlocking to locking position in the movement of said mechanism through the medium of the check, and means cooperating with said timing member for permitting the unlocking of said lock device when said timing member has not exceeded a predetermined movement and preventing the unlocking of said lock device when said timing member has exceeded said predetermined movement.

3. In combination, anchored restraining mechanism for an automobile to restrain movement thereof, and check-controlled means controlling the movement of said mechanism comprising a member movable to control the movement of said mechanism to restraining position, mechanism operable through the medium of a check for controlling said member, a lock device operating in locked condition to restrain movement of said member out of restraining position and when unlocked being out of such restraining position, a timing member operated by step movement by said mechanism and driving means therefor for driving said timing member in the direction opposite to that in which it is operated by said mechanism, means for releasably locking said first-named member in a position in which said first-named mechanism is in restraining position comprising a member movable from unlocking to locking position in the movement of said mechanism through the medium of the check, and means cooperating with said timing member for permitting the unlocking of said lock device when said timing member has not exceeded a predetermined movement and preventing the unlocking of said lock device when said timing member has exceeded said predetermined movement.

4. A clamp device for attachment to the handle portion of a door of an automobile having a lock remote from said handle portion comprising a body portion adapted to be applied to straddling position on said handle portion and a locking portion movable crosswise of said body portion into and out of locking position, said body having a portion forming a cover for the lock.

5. In a parking meter, the combination with anchored flexible restraining mechanism for an automobile to restrain movement thereof having a passage extending lengthwise therein and having a movable locking member, a flexible member lengthwise slidable in said passage for controlling the position of said locking member, and means for moving said flexible member.

6. In a parking meter, the combination of a casing, restraining mechanism for an automobile, means in said casing controlling said restraining mechanism, said casing having a movable section with which said mechanism is engaged and by which it is held in operative relation to said means, whereby when said movable section is displaced said mechanism is rendered releasable independently of said means, and a lock controlling said section.

7. In a parking meter, the combination of a casing, restraining mechanism for an automobile, means in said casing controlling said restraining mechanism, said casing having a movable cover and a movable section, said mechanism being engaged with said movable section and holding said mechanism in operative relation to said means whereby when said movable section is displaced said mechanism is rendered releasable independently of said means, and a lock device locking both said cover and section in place.

8. In combination, anchored restraining mechanism for an automobile to restrain movement thereof, and check-controlled means operative upon initial operation of said means through the medium of a check to condition said mechanism for restraining the automobile, and locking means for said mechanism in restraining position said check-controlled means comprising a ratchet member movable step-by-step in one direction in the repeated operations of said check-controlled means and controlling the operation of said lock means and drive means for moving said ratchet member in the opposite direction.

9. In a parking meter, the combination with anchored flexible restraining mechanism for an automobile to restrain movement thereof, said mechanism comprising relatively movable members one of which is anchored and has a passage extending lengthwise therein and the other of which is a lock member, a flexible member lengthwise slidable in said passage and controlling the position of said lock member, and means for moving said flexible member.

RAYMOND C. PIERCE.